US012091276B1

(12) United States Patent
Liu

(10) Patent No.: US 12,091,276 B1
(45) Date of Patent: Sep. 17, 2024

(54) WRAPPER CUTTER

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 18/520,088

(22) Filed: Nov. 27, 2023

Related U.S. Application Data

(63) Continuation of application No. 18/119,848, filed on Mar. 10, 2023.

(51) Int. Cl.
*B65H 35/06* (2006.01)
*B26D 7/14* (2006.01)

(52) U.S. Cl.
CPC ............... *B65H 35/06* (2013.01); *B26D 7/14* (2013.01); *B65H 2301/122* (2013.01); *B65H 2701/1944* (2013.01)

(58) Field of Classification Search
CPC .................................. B26D 1/045; B26D 7/14
See application file for complete search history.

(56) References Cited

U.S. PATENT DOCUMENTS 3,803,713 A * 4/1974 Jones ........................ B67B 7/30 30/2
4,756,085 A * 7/1988 Lebessis ................... B26B 7/00 30/286
4,757,611 A * 7/1988 Tommi ................... G07D 9/006 30/2
5,025,585 A * 6/1991 Powell ................... A01K 97/00 43/25
5,285,577 A * 2/1994 Carney ................... B26B 27/00 30/294
5,720,062 A * 2/1998 Vaught ................... B43M 7/002 30/294
5,768,787 A * 6/1998 Ireland .................... B26B 27/00 30/294
6,003,181 A * 12/1999 Wenk ..................... B43M 7/007 30/294
6,105,481 A * 8/2000 Schuler ............. B65H 35/0086 83/578
6,163,910 A * 12/2000 Cheldin ................. B43K 29/18 7/158
D438,440 S * 3/2001 Cheldin ........................... D8/48
6,223,639 B1 * 5/2001 Chen ......................... B26F 3/02 225/93
6,493,945 B1 * 12/2002 DeRosa .................. B26B 27/00 30/294
6,807,737 B1 * 10/2004 Davia ..................... B26B 5/006 30/294
D498,404 S * 11/2004 Schmidt ........................... D8/98
D501,387 S * 2/2005 Huang ........................... D8/104
D577,275 S * 9/2008 Visconti ......................... D8/102
D660,675 S * 5/2012 Gringer ............................ D8/98
D890,591 S * 7/2020 Lei .................................. D8/98
D915,507 S * 4/2021 Cran ........................... D18/34.9
(Continued)

*Primary Examiner* — Sean M Michalski

(57) ABSTRACT

Provided is a wrapper cutter, including a shell having an axially penetrating hollow structure. A notch extending along an axial direction is further formed in one side edge of the shell, and a cutting knife is fixedly arranged on an inner bottom wall of the notch. Supporting planes arranged axially are further arranged on a sidewall of the shell, can serve as contact planes between the wrapper cutter and a placing plane, and are used to perform positioning, force bearing and supporting in the case of wrapper cutting and assist the wrapper cutter to slide linearly.

9 Claims, 8 Drawing Sheets

(56) References Cited

U.S. PATENT DOCUMENTS

| | | | | | |
|---|---|---|---|---|---|
| D958,879 | S | | 7/2022 | Fan | |
| D968,190 | S | * | 11/2022 | Tang | D8/98 |
| 11,717,977 | B1 | * | 8/2023 | Xie | B26B 3/08 30/278 |
| 2007/0137454 | A1 | * | 6/2007 | DesRosiers | B65H 35/04 83/649 |
| 2008/0098868 | A1 | * | 5/2008 | Guillory | B65H 35/0086 83/649 |
| 2008/0168665 | A1 | * | 7/2008 | Chiang | B26B 5/00 30/286 |
| 2012/0125794 | A1 | * | 5/2012 | Elash | B65H 35/002 206/389 |
| 2018/0345516 | A1 | * | 12/2018 | Perla | B26D 1/045 |
| 2019/0168985 | A1 | * | 6/2019 | Vegliante | B26D 1/045 |

* cited by examiner

WRAPPER CUTTER

CROSS REFERENCE TO RELATED APPLICATION

This application is a continuation of US Design application Ser. No. 18/119,848, filed on Mar. 10, 2023, and the entire contents of which are incorporated herein by reference.

TECHNICAL FIELD

The present invention relates to the technical field of cutters, in particular to a wrapper cutter.

BACKGROUND

When cutting a rolled wrapper, a pair of scissors or a utility knife is usually used for cutting. However, when the pair of scissors or the utility knife is used to cut the wrapper, it is difficult to cut the rolled wrapper along a straight line, so wrapper cutters appear in the market. However, the wrapper cutters in the market are all of a cylindrical simple structure, which are poor in cutting effects, cannot ensure successful cutting of wrappers, and lead to uneven cut surfaces. Therefore, a wrapper cutter is proposed.

SUMMARY

The objective of the present invention is to provide a wrapper cutter in order to solve the problems raised in the above background.

In order to achieve the above objective, the present invention provides the following technical solution.

A wrapper cutter includes a shell having an axially penetrating hollow structure, an open slot from one end to the other is formed in a sidewall of the shell along an axial direction thereof, a notch extending along an axial direction is further formed in one side edge of the shell corresponding to the open slot, and a cutting knife is arranged fixedly on an inner bottom wall of the notch; and supporting planes arranged axially are further arranged on the sidewall of the shell, can serve as contact planes between the wrapper cutter and a placing plane, and are used to perform positioning, force bearing and supporting in the case of wrapper cutting and assist the wrapper cutter to slide linearly.

Further, the supporting planes can be two guideways arranged at an interval along an axial direction thereof, the two guideways are arranged in parallel to an axis of the shell, and when the wrapper cutter is used, the two guideways form the contact planes on the placing plane; and a grip is further arranged on the sidewall of the shell, and in the case of wrapper cutting, pressure applied by the grip is perpendicular to the contact supporting planes formed by the parallel guideways, so as to keep the wrapper cutter to cut linearly during cutting.

Further, a plane formed by an axial symmetrical center line of the two parallel guideways and an axial center line of the grip can pass through an axis of the shell; and a force applying center of gravity of the grip is perpendicular to the axial symmetrical center line between the two parallel guideways.

Further, the open slot is communicated with the notch, the cutter further includes a vertical plate, the vertical plate is arranged fixedly on a sidewall of the notch close to the open slot, an upper end of the vertical plate is arranged obliquely in a direction from the open slot to the notch, and the vertical plate is used to bend an introduced wrapper into an arc-shaped surface, so that the wrapper passing by a cutting position reaches a maximum stiffness and tension.

Further, the wrapper cutter further includes a fixed plate, which is externally arranged on one side edge of the notch close to the open slot.

Further, a cutting edge of the cutting knife is arranged obliquely in the notch.

Further, the wrapper cutter includes a rhombic indwelling notch, and the same slopes of the cutting knife and the fixed plate and two side edges of the notch form the rhombic indwelling notch.

Further, the shell includes a first shell, and the first shell is of a planar structure or of a polygonal track structure.

Further, the shell further includes a second shell, and a shape of the second shell is matched with that of a rolled wrapper.

Further, a limiting slope is arranged on an inner wall of the shell between the parallel guideways and is used to make a rolled wrapper abut against the cutting knife.

As can be seen from analysis, the present invention discloses a wrapper cutter, supporting planes are arranged on an outer wall of a shell, can serve as contact planes between the wrapper cutter and a placing plane, are used to perform positioning, force bearing and supporting in the case of wrapper cutting and assist the wrapper cutter to slide linearly, and are matched with a grip symmetrically arranged at top of the supporting planes. Pressure applied by the grip is perpendicular to the contact planes formed by the parallel guideways, so as to keep the wrapper cutter to cut linearly during cutting.

The wrapper cutter adopts the limiting slope, with the cooperation of the fixed plate, the rolled wrapper reaches the maximum tension, and then hits the cutting edge to generate a maximum lateral component force, and the wrapper which is not cut apart in the first place can be cut by climbing for the second time until the rolled wrapper is cut apart, and therefore, the rolled wrapper can be ensured to be cut; with the cooperation of the parallel guideways, the cut of the rolled wrapper is a straight line, which is even and aesthetic; and by setting the limiting slope, the rolled wrapper with a different diameter can always abut against the blade when cut, so that a best cutting effect can be achieved.

According to the technical solution of the present invention, the operation difficulty is reduced, the replacement time and the working intensity are greatly reduced, and the cost is saved.

BRIEF DESCRIPTION OF DRAWINGS

The accompanying drawings, which are incorporated in and constitute a part of the present application, are included to provide a further understanding of the present invention, and illustrative embodiments of the present invention and the description thereof are provided for explanation of the present invention and are not intended to unduly limit the present invention. In the drawings.

DESCRIPTION OF REFERENCE NUMERALS IN THE DRAWINGS

Figure 1:
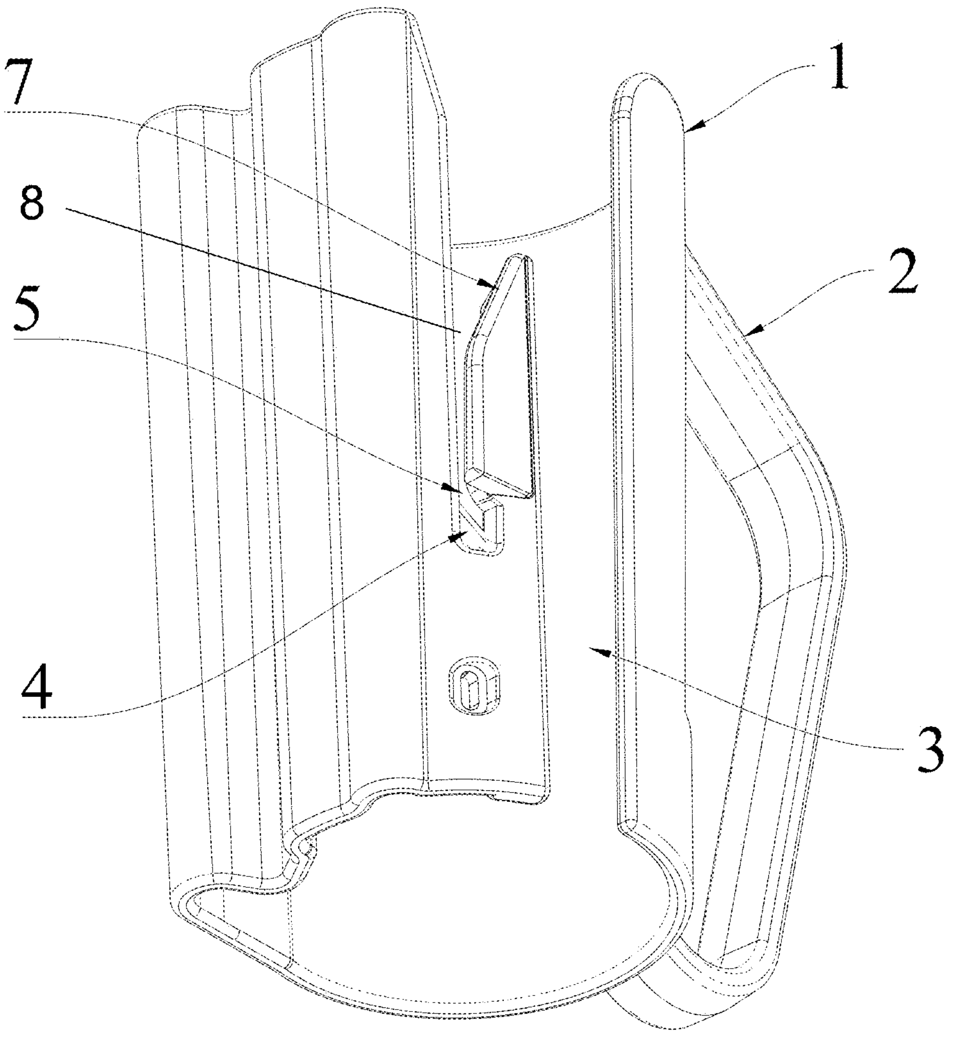
FIG. 1 is a schematic structural diagram of a wrapper cutter.
Figure 2:
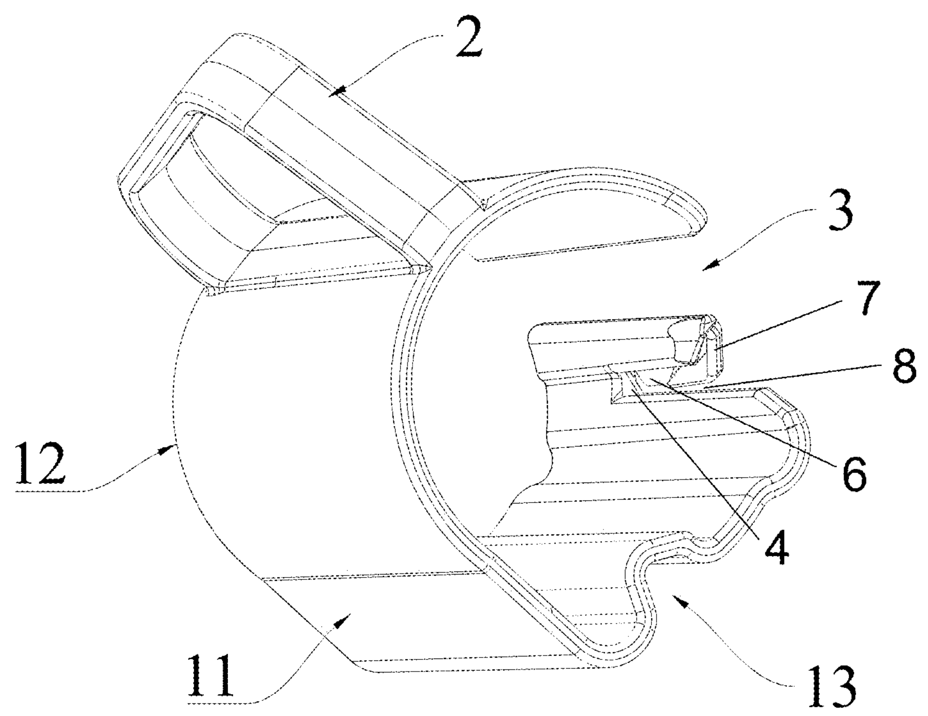
FIG. 2 is a schematic three-dimensional structural diagram of the wrapper cutter.
Figure 3:
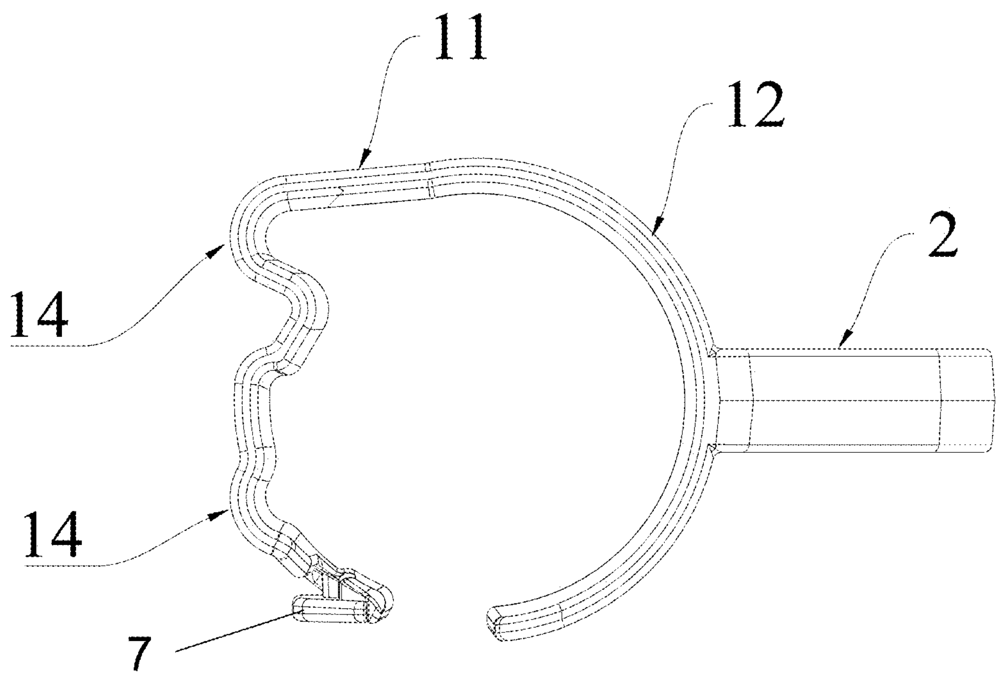
FIG. 3 is a schematic structural top view of the wrapper cutter.
Figure 4:
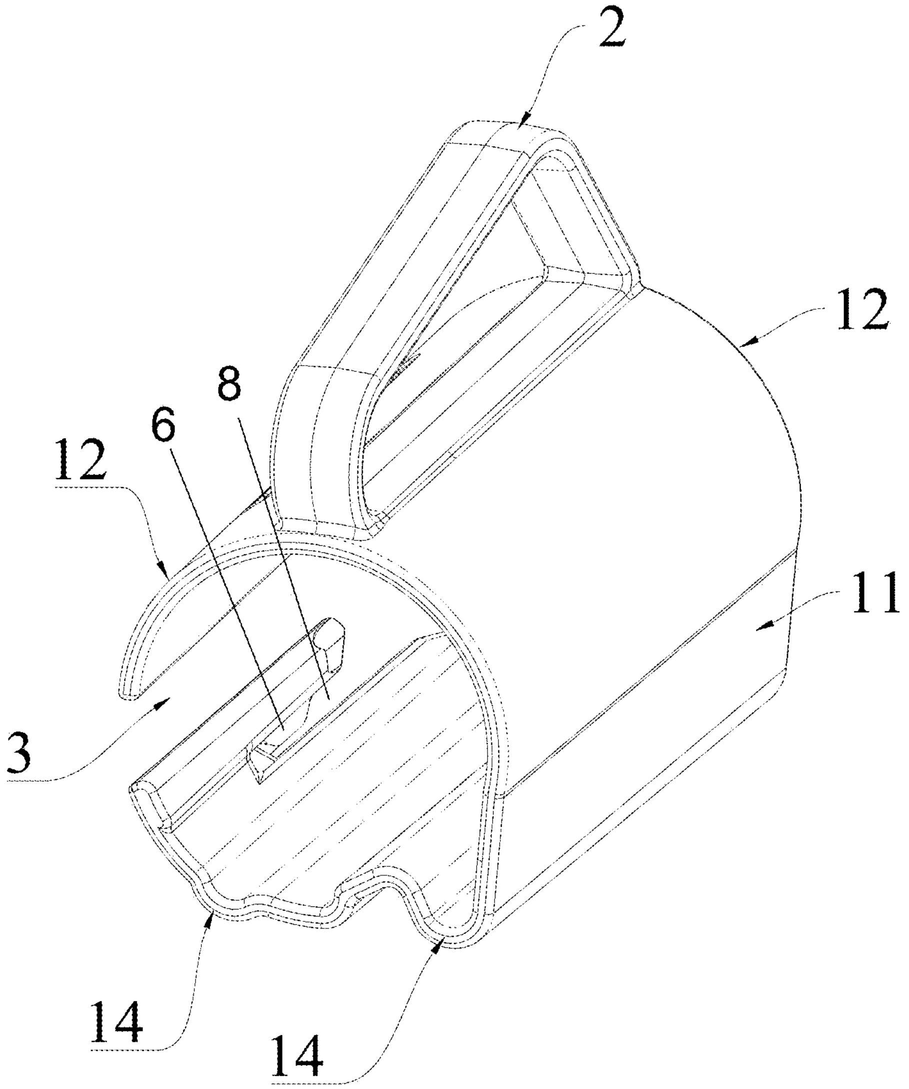
FIG. 4 is a schematic three-dimensional structural diagram of the wrapper cutter.

Shell; 11—First shell; 12—Second shell; 13—Limiting slope; 14—Parallel guideway; 2—Grip; 3—Open slot; 4—Cutting knife; 5—Rhombic indwelling notch; 6—Fixed plate; 7—Vertical plate; 8—Notch.

DETAILED DESCRIPTION

The present invention will be described in detail below with reference to the drawings and in conjunction with the embodiments. The embodiments are provided by way of explanation of the present invention and are not intended to limit the present invention. Indeed, it will be apparent to those skilled in the art that modifications and variations can be made in the present invention without departing from the scope or spirit of the present invention. For example, features shown or described as part of one embodiment may be used in another embodiment to produce yet another embodiment. It is therefore intended that the present invention encompasses such modifications and variations as come within the scope of the appended claims and their equivalents.

In the description of the present invention, the terms "longitudinal", "lateral", "upper", "lower", "front", "back", "left", "right", "vertical", "horizontal", "top", "bottom" and the like indicate orientations or positional relationships based on those shown in the accompanying drawings, and are intended only for the purpose of facilitating the description of the present invention rather than for requiring that the present invention must be constructed and operated with a particular orientation and, therefore, are not to be construed as a limitation of the present invention. The terms "join", "connect", and "arrange" as used herein are to be construed broadly, for example, it may be a fixed connection or a removable connection, a direct connection or an indirect connection through an intermediate member, a wired electrical connection, a wireless electrical connection, or a wireless communication signal connection. Those skilled in the art can understand the specific meanings of the above terms according to a specific situation.

One or more embodiments of the present invention is/are illustrated in the accompanying drawings. The detailed description uses numerical and alphabetical reference signs to refer to features in the drawings. Similar or like reference signs in the drawings and descriptions have been used to refer to similar or like parts of the present invention. As used herein, the terms "first", "second" and "third" and the like are used interchangeably to distinguish one member from another and are not intended to denote the location or importance of individual members.

As shown in FIGS. 1 to 9, an embodiment of the present invention provides a wrapper cutter, including a shell 1 and a cutting knife 4. The shell 1 has a vertically penetrating hollow structure, the shell 1 includes a first shell 11 and a second shell 12, a shape of the second shell 12 is matched with that of a rolled wrapper and is generally in a hollow cylindrical shape, an open slot 3 vertically penetrating is formed in the shell 1 and is arranged from one end to the other in a sidewall of the shell 1 along an axial direction thereof, a notch 8 extending along a vertical direction is further formed in one side edge of the open slot 3, the open slot 3 is communicated with the notch 8, and the cutting knife 4 is arranged fixedly on an inner bottom wall of the notch 8. Supporting planes 14 arranged axially are further arranged on the sidewall of the shell 1, can serve as contact planes between the cutter and a placing plane, and are used to perform positioning, force bearing and supporting in the case of wrapper cutting and assist the wrapper cutter to slide linearly.

Figure 9:
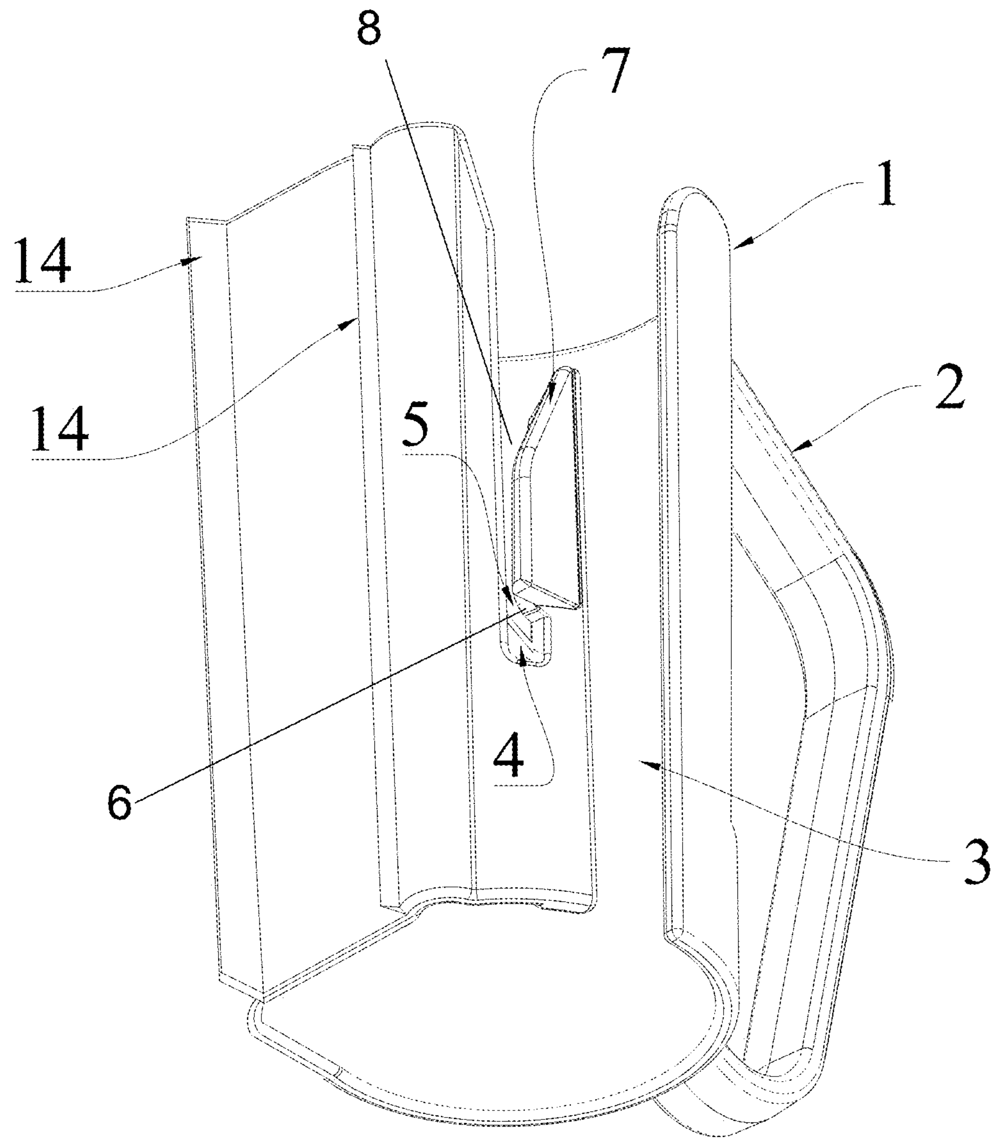
FIG. 9 is a schematic structural diagram of another embodiment of the wrapper cutter.

As shown in FIG. 1, the first shell 11 is of a polygonal track structure or the supporting planes 14 protruding outward are arranged on the outer wall of the first shell 11. Or as shown in FIG. 9, the two parallel guideway supporting planes 14 parallel to the central axis of the shell 1 may be two guideways arranged at an interval along the axial direction thereof, the two guideways are arranged parallel to an axis of the shell, and when the wrapper cutter is used, the two guideways form the contact supporting planes 14 on the placing plane; and a grip 2 is further arranged on the sidewall of the shell, and in the case of wrapper cutting, pressure applied by the grip 2 is perpendicular to the contact supporting planes 14 formed by the parallel guideways, so as to keep the wrapper cutter to cut linearly during cutting.

A rhombic indwelling notch 5 is arranged at one side of the cutting knife 4. A fixed plate 6 is arranged fixedly on one side of the first shell 11 close to the open slot 3, and is used to bend an introduced wrapper into an arc-shaped surface, the rhombic indwelling notch is formed with the cutting knife 4, so that the wrapper passing by a cutting position further reaches a maximum stiffness and tension The supporting planes 14 are arranged on the first shell 11, and a limiting slope 13 is arranged between the supporting planes 14 and is used to make a rolled wrapper abut against the cutting knife 4.

In the embodiment of the present invention, the rolled wrapper is introduced into the shell 1, and the fixed plate 6 bends the rolled wrapper into an n-shaped arch according to the shape of an arc, so that the rolled wrapper reaches the maximum tension and hits the cutting edge of the cutting knife 4 at an angle of 40 degrees to generate a maximum lateral component force. If the rolled wrapper is not cut apart in the first place, the rhombic indwelling notch 5 is intended to make the rolled wrapper bend into the n-shaped arch for the second time in cooperation with the first shell 11 and climb along the slope of the rhombic indwelling notch 5, so that the cutting knife 4 continues to cut the rolled wrapper until the rolled wrapper is cut apart. By arranging the first shell 11 of the shell 1 into a polygonal track structure, the shape of the second shell 12 of the shell 1 is matched with that of the rolled wrapper, so that the rolled wrapper can be clamped and attached to the cut, and therefore, the rolled wrapper can reach the maximum tension, and a best cutting effect is achieved.

The supporting planes 14 which are shaped like a sled can slide linearly along the rolled wrapper. Since the rolled wrapper is straight, the supporting planes 14 will only slide linearly, so that the cut surface of the wrapper can appear as a straight line. The sidewall of the limiting slope 13 close to the second shell 12 is arranged obliquely in a direction from junction between the first shell 11 and the second shell 12 to the open slot 3. Since the rolled wrapper becomes less and less, under the function of the limiting slope 13, the rolled wrapper with a different diameter (the diameter of the rolled wrapper is less than 5.5 cm) can always abut against the blade when cut, so that a best cutting effect is achieved.

Figure 5:
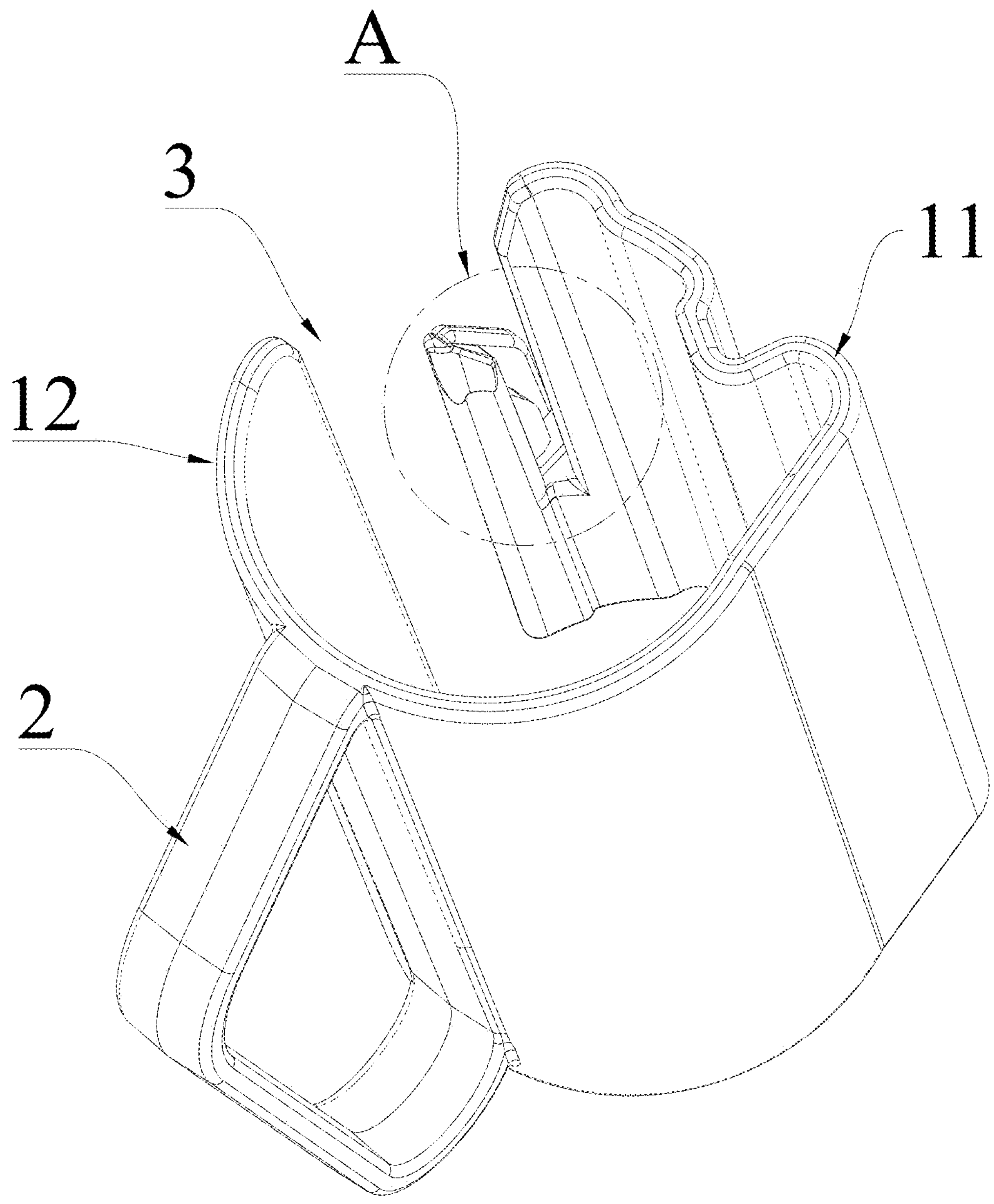
FIG. 5 is a schematic three-dimensional structural diagram of the wrapper cutter.
Figure 6:
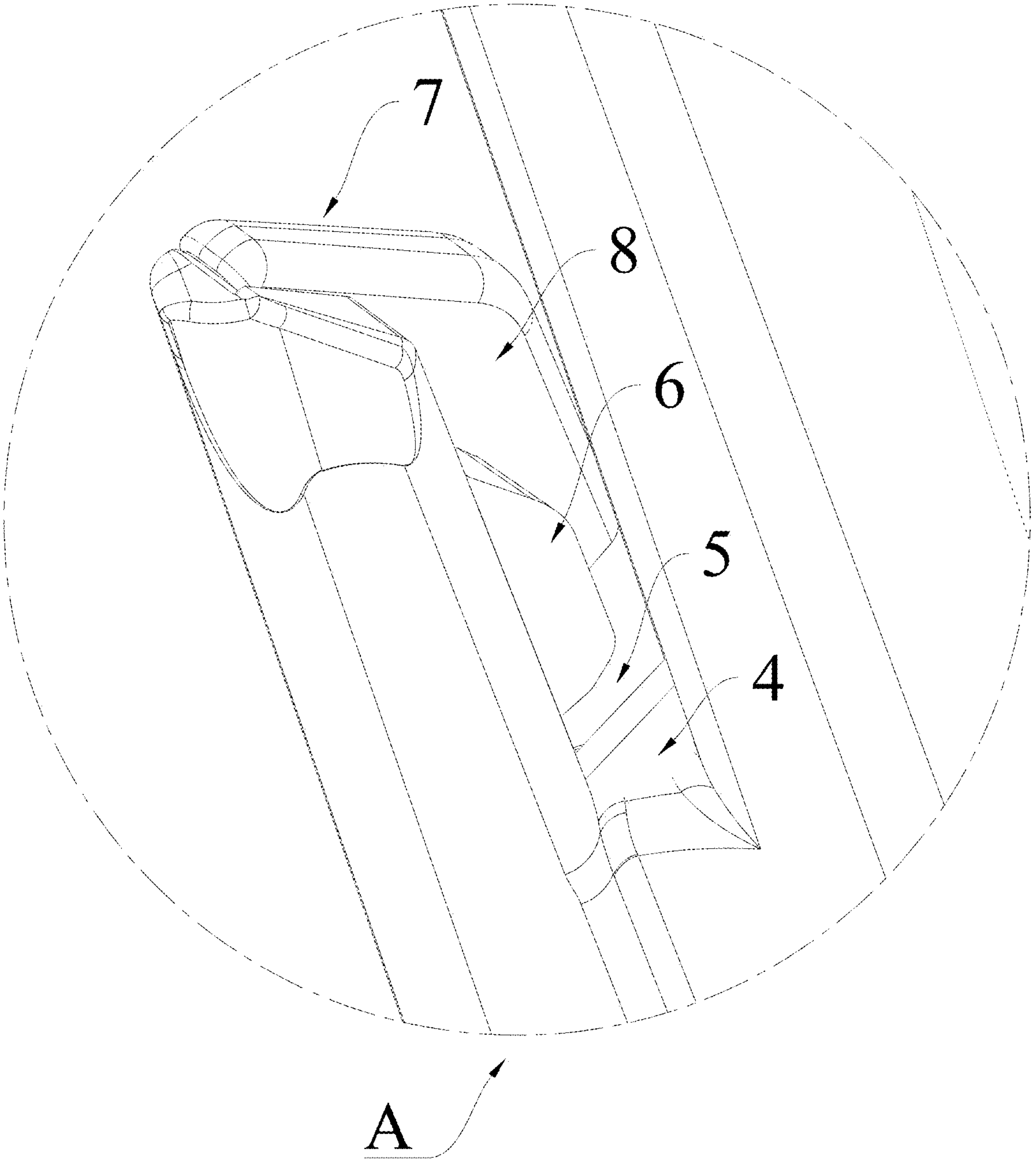
FIG. 6 is an enlarged schematic structural diagram of the wrapper cutter in area A in FIG. 5.
Figure 7:
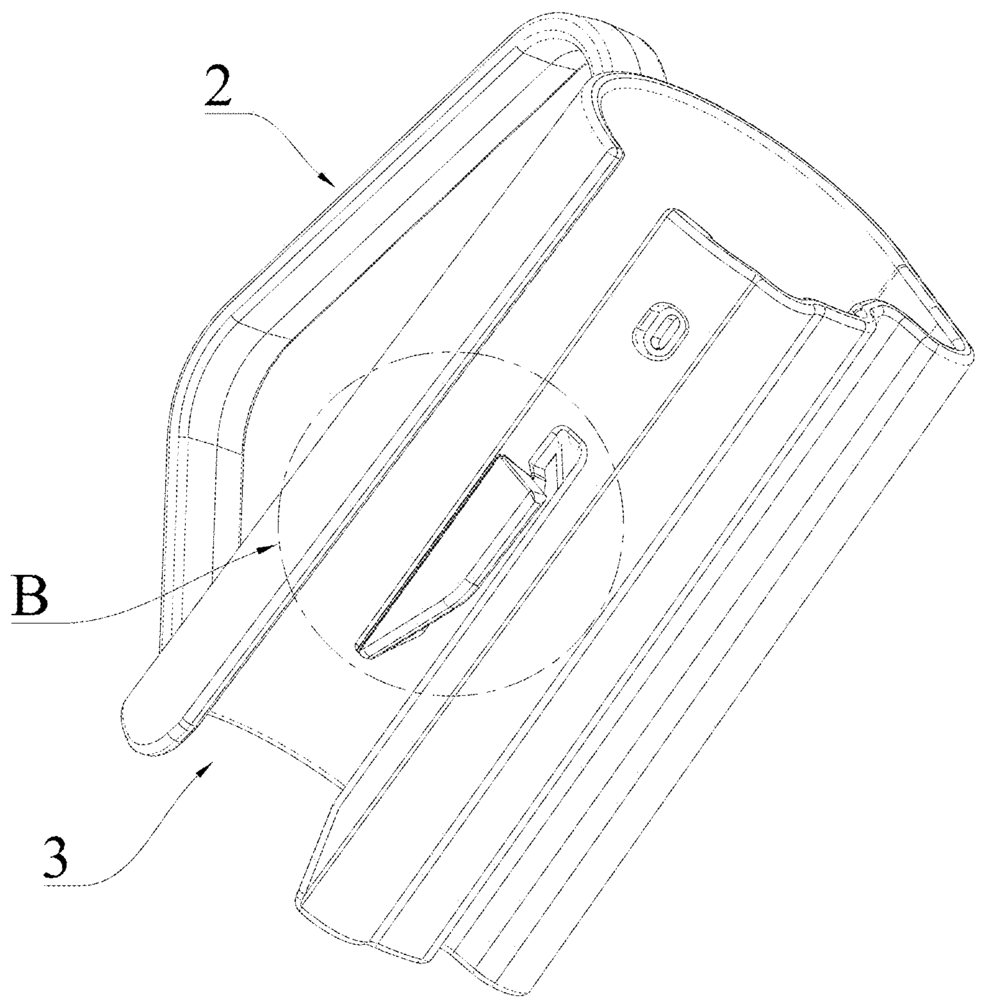
FIG. 7 is a schematic three-dimensional structural diagram of the wrapper cutter.
Figure 8:
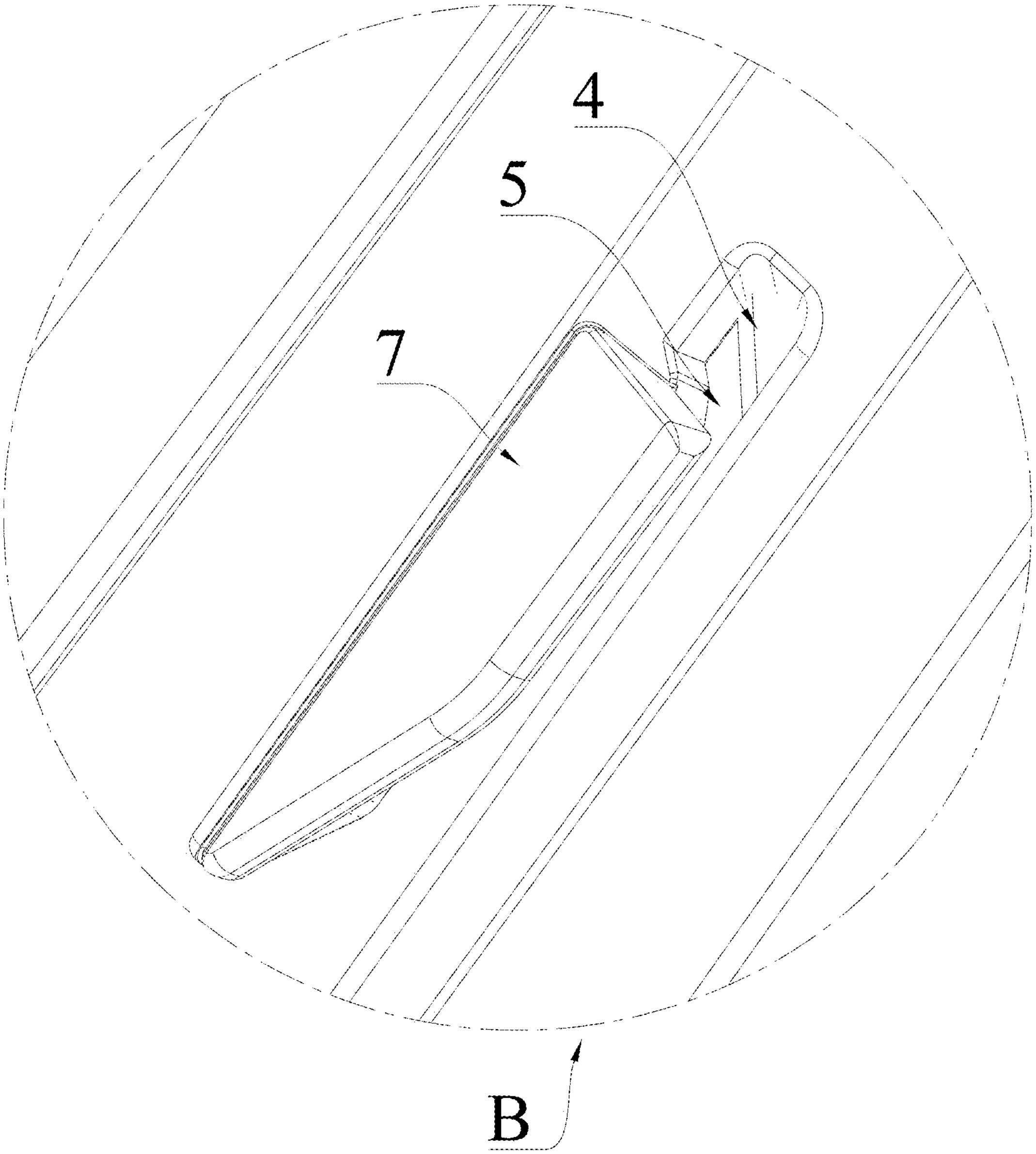
FIG. 8 is an enlarged schematic structural diagram of the wrapper cutter in area B in FIG. 7.

As shown in FIGS. 5, 6 and 8, as a preferred embodiment of the present invention, an upper end of the fixed plate 6 is arranged obliquely from the open slot 3 to the notch 8.

As a preferred embodiment of the present invention, a vertical plate 7 is further arranged. The fixed plate 7 is arranged on a sidewall of the notch 8 close to the open slot 3, and an upper end of the vertical plate 7 is arranged obliquely in a direction from the open slot 3 to the notch 8.

In the embodiment of the present invention, the vertical plate 7 can force the introduced rolled wrapper to be bent into an arc-shaped surface, the vertical plate 7 can press the rolled wrapper downwards towards a center of the shell, the cutting knife 4 can pull the wrapper upwards in an opposite direction, and the two interaction forces enable the wrapper passing by the cutting position to achieve the maximum stiffness and tension, so that the rolled wrapper can hit the cutting edge of the cutting knife 4 to generate a maximum lateral component force to realize cutting.

As shown in FIGS. 1 and 9, as a preferred embodiment of the present invention, the cutting edge of the cutting knife 4 is arranged obliquely in the notch 8.

In the embodiment of the present invention, the cutting edge of the cutting knife 4 is arranged obliquely to facilitate cutting of the rolled wrapper.

In the embodiment of the present invention, during use, the wrapper cutter is attached tightly to a desktop and pushed along a direction of the rolled wrapper, so that the rolled wrapper can be easily and perfectly cut.

As shown in FIG. 1, as a preferred embodiment of the present invention, a grip 2 is connected fixedly to the shell 1.

In the embodiment of the present invention, during use, a hand holds the grip 2 to push the wrapper cutter, so the wrapper cutter is convenient to use.

The operating principle of the present invention is as follows.

Before cutting, a single sheet of wrapper is drawn from a to-be-cut wrapper roll to pass through the open slot 3, and parallel positioning and determining of a wrapper cutting width are carried out by the other side edge of the open slot 3 without the cutting knife. After determining, the wrapper roll can be axially pulled out and then put into the notch 8 for wrapper clamping and cutting.

According to the wrapper cutter, the rolled wrapper is introduced into the shell 1 and bent into an n-shaped arch according to the shape of an arc, so that the rolled wrapper reaches the maximum tension and hits the cutting edge of the cutting knife 4 at an angle of 40 degrees to generate a maximum lateral component force; if the rolled wrapper is not cut apart in the first place, the rhombic indwelling notch 5 is intended to make the rolled wrapper bend into the n-shaped arch for the second time in cooperation with the vertical plate 7 and the first shell 11 and climb along the slope of the rhombic indwelling notch 5, so that the cutting knife 4 continues to cut the rolled wrapper until the rolled wrapper is cut apart; by arranging the supporting planes 14, the cut surface of the wrapper can appear as a straight line; by arranging the limiting slope 13, the rolled wrapper with a different diameter can always abut against the blade when cut, so that a best cutting effect is achieved.

The above is merely the preferred embodiments of the present invention and is not intended to limit the present invention. Various modifications and variations of the present invention will be possible to those skilled in the art. Any modification, equivalent replacement, improvement, etc. made within the spirit and principles of the present invention should be included in the scope of protection of the present invention.

What is claimed is:

1. A wrapper cutter, comprising a shell having an axially penetrating hollow structure, wherein an open slot from one end to an other end is formed in a sidewall of the shell along an axial direction thereof, a notch extending along an axial direction is further formed in one side edge of the shell corresponding to the open slot, and a cutting knife is arranged fixedly on an inner bottom wall of the notch; and supporting protrusions are axially arranged on the sidewall of the shell, and are configured to position and support the wrapper cutter and assist the wrapper cutter to slide linearly;

wherein the open slot is communicated with the notch, the wrapper cutter further comprises a vertical plate, the vertical plate is fixedly arranged on a sidewall of the notch; the vertical plate and the sidewall of the notch form a structure having a V-shaped cross-section.

2. The wrapper cutter of claim 1, wherein the supporting protrusions are two guideways arranged at an interval along an axial direction thereof, the two guideways are arranged parallel to an axis of the shell and a grip is further arranged on the sidewall of the shell, and in the case of wrapper cutting, pressure applied by the grip is perpendicular to the contact supporting planes formed by the parallel guideways, so as to keep the wrapper cutter to cut linearly during cutting.

3. The wrapper cutter of claim 2, wherein a plane formed by an axial symmetrical center line of the two parallel guideways and an axial center line of the grip is capable of passing through an axis of the shell.

4. The wrapper cutter of claim 2, wherein a slope is arranged on an inner wall of the shell between the parallel guideways and is configured to make a rolled wrapper abut against the cutting knife.

5. The wrapper cutter of claim 1, wherein a cutting edge of the cutting knife is arranged obliquely in the notch.

6. The wrapper cutter of claim 1, wherein the shell comprises a first shell, and the first shell is provided with parallel guideways or a track structure with a polygonal cross-section.

7. The wrapper cutter of claim 6, wherein the shell further comprises a second shell, and a shape of the second shell is matched with that of a rolled wrapper.

8. A wrapper cutter, comprising a shell having an axially penetrating hollow structure, wherein an open slot from one end to an other end is formed in a sidewall of the shell along an axial direction thereof, a notch extending along an axial direction is further formed in one side edge of the shell corresponding to the open slot, and a cutting knife is arranged fixedly on an inner bottom wall of the notch; and supporting protrusions are axially arranged on the sidewall of the shell, and are configured to position and support the wrapper cutter and assist the wrapper cutter to slide linearly;

wherein the wrapper cutter further comprises a fixed plate arranged within the notch and on one side edge of the notch.

9. The wrapper cutter of claim 8, further comprising a indwelling notch, wherein an edge of the cutting knife, a lower edge of the fixed plate and two side edges of the notch form the indwelling notch.

* * * * *